(12) United States Patent
Tan et al.

(10) Patent No.: US 6,207,243 B1
(45) Date of Patent: Mar. 27, 2001

(54) FUSER MEMBER WITH MERCAPTO-TREATED AL₂O₃ FILLER

(75) Inventors: Biao Tan, Rochester; Jiann-Hsing Chen, Fairport; Tonya D. Binga, Rochester; Wayne T. Ferrar, Fairport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/032,004

(22) Filed: Feb. 27, 1998

(51) Int. Cl.⁷ .................... G03G 15/20; B32B 25/02; B32B 25/08; B32B 25/20
(52) U.S. Cl. ............ 428/35.9; 428/405; 428/421; 428/447; 428/448; 428/451; 399/333; 492/56
(58) Field of Search .................... 428/421, 422, 428/405, 35.9, 447, 448, 451; 492/56; 399/333

(56) References Cited

U.S. PATENT DOCUMENTS

| | | | |
|---|---|---|---|
| 4,185,140 | * 1/1980 | Strella et al. ................ | 428/418 |
| 4,711,818 | * 12/1987 | Henry .......................... | 428/421 |
| 4,810,578 | * 3/1989 | Prescott et al. ............... | 428/405 |
| 5,017,432 | 5/1991 | Eddy et al. .................... | 428/422 |
| 5,217,837 | * 6/1993 | Henry et al. .................. | 430/124 |
| 5,269,740 | 12/1993 | Fitzgerald et al. ............. | 492/56 |
| 5,292,562 | 3/1994 | Fitzgerald et al. ............. | 428/35.8 |
| 5,292,606 | 3/1994 | Fitzgerald ..................... | 428/35.8 |
| 5,336,596 | 8/1994 | Bronstein et al. .............. | 435/6 |
| 5,401,570 | 3/1995 | Heeks et al. .................. | 428/332 |
| 5,464,698 | 11/1995 | Chen et al. ................... | 428/421 |
| 5,480,724 | 1/1996 | Fitzgerald et al. ............. | 428/447 |
| 5,595,823 | 1/1997 | Chen et al. ................... | 428/421 |
| 5,824,416 | * 10/1998 | Chen et al. ................... | 428/422 |
| 5,853,893 | * 12/1998 | Chen et al. ................... | 428/421 |

* cited by examiner

Primary Examiner—Paul Thibodeau
Assistant Examiner—Ramsey Zacharia
(74) Attorney, Agent, or Firm—Doreen M. Wells

(57) ABSTRACT

A fuser member having an outermost layer comprising a fluoroelastomer with thermally conductive fillers treated with a mercapto-functionalized silane coupling agent that is interactive with a fluoroelastomer to provide a fuser roller surface of decreased toner offset and abrasion and increased toner release and thermal conductivity.

18 Claims, No Drawings

FUSER MEMBER WITH MERCAPTO-TREATED AL$_2$O$_3$ FILLER

CROSS REFERENCE TO RELATED APPLICATIONS

The present application is related to the following titled applications.

U.S. Ser. No. 08/962,129, filed Oct. 31, 1997, titled FUSER MEMBER WITH SURFACE TREATED AL$_2$O$_3$ AND FUNCTIONALIZED RELEASE FLUIDS U.S. Ser. No. 08/961,838, filed Oct. 31, 1997, titled FUSER MEMBER WITH CHEMICALLY MODIFIED ELASTOMER/FILLERS AND FUNCTIONALIZED RELEASE FLUIDS U.S. Ser. No. 08/962,108, filed Oct. 31, 1997, titled FUSER MEMBER WITH SURFACE TREATED SnO$_2$ FILLER, U.S. Ser. No. 09/031,883, U.S. Pat. No. 6,090,491, filed concurrently herewith, titled FUSER MEMBER WITH STYRYL-TREATED AL$_2$O$_3$ FILLER AND FUNCTIONALIZED RELEASE FLUIDS, the contents of which are included herein in their entirety.

FIELD OF THE INVENTION

This invention relates generally to heat fusing members and methods of making same. More particularly, it relates to an improved fuser roller surface that decreases toner offset and abrasion and increases toner release and thermal conductivity.

BACKGROUND OF THE INVENTION

In electrophotographic fuser systems, fuser roller overcoats are made with layers of polydimethylsiloxane (PDMS) elastomers, fluorocarbon resins and fluorocarbon elastomers. PDMS elastomers have low surface energy and relatively low mechanical strength, but is adequately flexible and elastic and can produce high quality fused images. After a period of use, however, the self-release property of the roller degrades and offset begins to occur. Application of a PDMS oil during use enhances the release property of the fuser roller surface but shortens roller life due to oil swelling. Fluorocarbon resins like polytetrafluoro-ethylene (PTFE) have good release property but less flexibility and elasticity than PDMS elastomers. Fluorocarbon elastomers, such as Viton™ and Fluorel™, are tough, flexible, resistant to high temperatures, durable and do not swell, but they have relatively high surface energy and poor thermal conductivity.

Particulate inorganic fillers have been added to fluorocarbon elastomers and silicone elastomers to increase mechanical strength and thermal conductivity. High thermal conductivity is an advantage because heat needs to be efficiently and quickly transmitted from an internally heated core to the outer surface of the fuser roller to fuse the toners and yield the desired toner images. However, incorporation of inorganic fillers to improve thermal conductivity has a major drawback: it increases the surface energy of fuser roller surface and also increases the interaction of the filler with the toner and receiver. After a period of use, the toner release properties of the roller degrade and toner offset begins to occur due to roller wear and weak interaction between the filler and the polymer matrix. It would be desirable to provide a fuser member having a fluorocarbon elastomer overcoat layer containing thermally conductive inorganic fillers, but which still has a moderately low surface energy and good toner release property. In addition, it should be compatible with the functionalized polymeric release agent employed during fixing process.

Fuser members of fluorocarbon elastomer containing inorganic filler are disclosed, for example, in U.S. Pat. No. 5,464,698 to Chen et al. which describes fuser rollers having a surface layer comprising fluorocarbon elastomer and tin oxide fillers. The fillers provide active sites for reacting the mercapto-functional polydimethylsiloxane. However, the inorganic fillers are untreated and remain highly reactive with the toner and charge control agent, and this is undesirable.

U.S. Pat. No. 5,595,823 to Chen et al. describes fuser rollers having a surface layer comprising fluorocarbon elastomer and aluminum oxide fillers which also are untreated and are prone to high reactivity with toner and charge control agent which, again, is undesirable.

U.S. Pat. No. 5,017,432 to Eddy et al. describes a fluorocarbon elastomer fuser member which contains cupric oxide to interact with the polymeric release agent and provide an interfacial barrier layer.

Fuser members of condensation-crosslinked PDMS elastomers filled with metal oxides are disclosed, for example, in U.S. Pat. No. 5,401,570 to Heeks et al. This patent describes a silicone rubber fuser member containing aluminum oxide fillers which react with a silicone hydride release oil.

U.S. Pat. No. 5,480,724 to Fitzgerald et al. discloses tin oxide fillers which decrease fatigue and creep (or compression) of the PDMS rubber during continuous high temperature and high stress (i.e. pressure) conditions.

Some metal oxide filled condensation-cured PDMS elastomers are also disclosed in U.S. Pat. No. 5,269,740 (cupric oxide filler), U.S. Pat. No. 5,292,606 (zinc oxide filler), U.S. Pat. No. 5,292,562 (chromium oxide filler), and U.S. Pat. No. 5,336,596 (nickel oxide filler). All provide good results.

Unfortunately, as fuser rollers wear, the metal oxide fillers become exposed and react not only with the functionalized polymeric release agent, but also with the toner, paper substrate and charge control agent. Such reactions build up debris on the surface of the fuser roller, impairing toner release and reducing the life of the fuser roller. There is therefore a need in the industry for fuser rollers with metal oxide fillers that interact more with the roller material (e.g. fluoroelastomer) so that they are less prone to exposure as the rollers wear. Such fillers must also be compatible with polymeric release agents.

In U.S. patent applications U.S. Ser. Nos. 08/962,129; 08/961,838; and 08/962,108, incorporated herein in their entirety, Tan et al. taught that metal oxide particles that are treated with a coupling agent having amino functional groups can decrease abrasion of the fuser member overcoat and also enhance fuser/toner release. It is believed that the amino functional groups on the coupling agent interact with the fluorocarbon polymers and bond with them.

There is the need, however, to have different coupling reactive chemistry other than the amino-functionalized coupling reagents taught by Tan et al.

SUMMARY OF THE INVENTION

The present invention provides an alternative to amino functionalized coupling reagents by providing: a fuser member comprising a support and coated thereon, a fluoroelastomer layer comprising a metal oxide filler selected from aluminum oxide, cupric oxide, and mixtures thereof, said filler being associated with a mercapto-functionalized silane coupling agent.

The present invention also provides a method of making a fuser member comprising the steps of: providing a cylindrical core; compounding a fluoroelastomer with a metal oxide filler selected from aluminum oxide, cupric oxide, and mixtures thereof, the filler being associated with a mercapto-functionalized silane coupling agent; coating the fluoroelastomer on the cylindrical core; and curing the fuser member.

Metal oxide fillers which have been thus modified can interact with fluorocarbon polymers and bond with them. Such fillers also help to wet the surface and thereby facilitate compounding. The fuser member of the invention greatly improves fuser/toner release, toner offset on the roller surface and decreases abrasion of the fuser member overcoat. The invention provides an effective, durable fuser roller and high quality copies at high speed.

The toner/fuser release can be further improved by applying to the outermost layer of the fuser member an effective amount of a polymethyldisiloxane (PDMS) release agent that, optionally, includes at least one functional group reactive with the fluoroelastomer, followed by incubation at an elevated temperature. While not wishing to be bound by the proposed theory, it is believed that the functional groups on the releasing agent bring about an interaction between filler and release fluid, thereby forming a protective layer between toner and filler.

An additional advantage is that this invention allows for a high percentage of metal oxide fillers in the fluoroelastomer and therefore high thermal conductivity can be achieved. At the same time, critical fuser properties such as release and wear are not sacrificed.

DETAILED DESCRIPTION OF THE INVENTION

The fluorocarbon elastomers used in the invention were prepared according to the method described in commonly owned U.S. Ser. No. 08/805,479 of Chen et al., filed Feb. 25, 1997, titled Toner Fuser Member Having A Metal Oxide Filled Fluoroelastomer Outer Layer With Improved Toner Release and incorporated herein by reference.

In the fuser member of the present invention, the outermost layer comprises a cured fluoroelastomer, preferably a terpolymer of vinylidene fluoride (VF), tetrafluoroethylene (TFE), and hexafluoropropylene (HFP), that includes at least about 21 mole percent HFP and, preferably, at least about 50 mole percent VF. Among commercially available fluoroelastomers, Viton™ materials, obtainable from DuPont, are frequently employed for the fabrication of fuser members. These materials include Viton™ A, containing 25 mole percent HFP; Viton™ E45, containing 23 mole percent HFP; and Viton™ GF, containing 34 mole percent HFP.

A preferred fluoroelastomer for the outermost layer of the fuser member of the present invention is Fluorel™ FX-9038, available from 3M, containing 52 mole percent VF, 34 mole percent TFE, and 14 mole percent HFP. More preferred is Fluorel™ FE-5840Q, also available from 3M, containing 53 mole percent VF, 26 mole percent TFE, and 21 mole percent HFP.

At least 10 parts by weight of metal oxide per 100 parts by weight of cured fluoroelastomer are included in the outermost layer of the fuser member. The metal oxide may be cupric oxide, aluminum oxide, or mixtures thereof. In a preferred embodiment, 10 to 50 parts of cupric oxide are included in the outermost layer. In another preferred embodiment, 30 to 280 parts of aluminum oxide by weight are included per 100 parts by weight of the fluoroelastomer. Alumina may also be included as a thermally conductive filler in the layer; in one embodiment, 140 parts per 100 parts (by weight) of fluoroelastomer are The preferred silane coupling agent has the general structure:

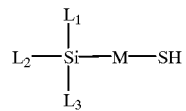

wherein:
$L_1, L_2, L_3$ represent alkoxy, alkyl, halide, etc. with C atom numbers varying from 0–10 and at least one of the L should be alkoxy or halide. M represents aliphatic or aromatic chain with C atom numbers varying from 0–20.

Suitable coupling agents are: Mercaptomethyldimethlethoxysilane, (Mercaptomethyl)methyldiethoxysilane, 3-Mercaptopropylmethyldimethoxysilane, 3-Mercaptopropyltrimethoxysilane and 3-Mercaptopropyltriethoxysilane, etc. Preferably, the silane coupling agent is the amount of 0.1–10.0 weight percent.

Although the fuser member of the invention, wherein the metal oxide particles have been treated with a coupling agent, exhibits generally good toner offset and release characteristics, these properties may be improved by applying a polydimethylsiloxane (PDMS) release agent to the outermost layer and incubating the fuser member to form a surface that displays enhanced toner release. Preferred PDMS release agents, which include a functional group that is reactive with the fluoroelastomer, have the general formula:

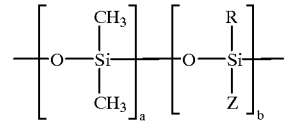

where R is alkyl or aryl, Z is selected from the group consisting of hydrogen, aminoalkyl containing up to about 8 carbon atoms, and mercapto alkyl containing up to about 8 carbon atoms, and the ratio of a:b is about 1:1 to 3000:1. In more preferred embodiments, Z is hydrogen, aminopropyl, or mercapto propyl. In a particularly preferred embodiment, Z is hydrogen and the a:b ratio is about 10:1 to 200:1. In another particularly preferred embodiment, Z is aminopropyl and the a:b ratio is about 200:1 to 2,000:1.

An example of a hydrogen-functionalized PDMS release agent is EK/PS-124.5 (available from United Chemical), which contains 7.5 mole percent of the functionalized component and has a viscosity of 225 centistokes. Xerox amino-functionalized PDMS 8R3995 fuser agent II contains 0.055 mole percent of an aminopropyl-substituted component and has a viscosity of 300 centistokes. Xerox mercapto-functionalized PDMS 8R2955 contains 0.26 mole percent of a mercapto propyl-substituted component and has a viscosity of 275 centistokes. A non-functionalized PDMS release oil, DC-200 (from Dow Corning), is useful for purposes of comparison with the functionalized agents and has a viscosity of 350 centistokes.

The invention is further illustrated by the following examples and comparative examples.

Materials

Fluorel™ FE Fluoroelastomer 5840Q, ter-polymer of vinylidene fluoride, hexafluoropropylene and tetrafluoroethylene (FE5840Q)—3M, Co., St. Paul, Minn.

MgO (Maglite™ D)—Marine Magnesium Co., Chicago, Ill.

Ca(OH)$_2$—Aldrich®, Milwaukee, Wis.

$Al_2O_3$ (T-64)—Whitaker Clark & Daniels, Inc. South Plainfield, N.J.

CuO—J. T. Baker®, Phillipsburg, N.J.

3- Mercaptopropyltrimethoxysilane(SHCR)—PCR®, Gainesville, Fla.

EXAMPLE 1 (E-1)

Treatment of Filler Surface with Coupling Reagent Solution

Treatment solution was freshly prepared by adding 3-mercaptopropyltrimethoxysilane (2 wt. %) to $EtOH/H_2O$ (95/5 by vol.) solvent and stirred for 10 minutes. Fillers ($Al_2O_3$ or CuO or mixtures thereof) were covered by solution and stirred in ultrasonic bath for 10 minutes. Fillers were then washed twice with EtOH and dried under reduced pressure (under vacuum) at 150° C. for 30 minutes and at room temperature overnight.

Compounding

Fluorel™ FE5840Q (100 gm), MgO (3 gm), Ca(OH)2 (6 gm) and both surface treated $Al_2O_3$ (140 gm) and CuO (50 gm)—were thoroughly compounded in a two roll mill with water cooling at 63° F. (17° C.) until a uniform, dry composite sheet was obtained.

Preparation of a Compression Mold Slab

The fluoroelastomer-treated fillers gum obtained as described above was compression molded into 75-mil plaques, with curing for 20 minutes at 350° F. (177° C.) under 45 tons pressure and post-curing for 48 hours at 450° F. (232° C.). The plaques were employed in tests to evaluate the toner offset and release characteristics, wear and thermal conductivity as described below and results are indicated in Table 1.

EXAMPLE 2 (E-2)

Substantially the same procedure as in Example 1, except that the CuO fillers were not surface treated and the results are indicated in Table 1.

EXAMPLE 3 (E-3)

Substantially the same procedure as in Example 1, except that the fillers were not surface treated. However, during the compounding, 1.4 g of 3-mercaptopropyltrimethoxysilane (1 wt. %) was used as additives and the results are indicated in Table 1.

Comparative Example 1 (C-1)

Substantially the same procedure as in Example 1, except that the $Al_2O_3$ and CuO fillers were not surface treated and the results are indicated in Table 1.

Test Methods for Results in Table 1

The four tests described immediately below were conducted using the plaques of Example 1 above. Results appear in Table 1.

Toner Offset and Release Measurement

These procedures are described in U.S. Ser. No. 08/805,479 of Chen et al. filed Feb. 25, 1997, titled Toner Fuser Member Having A Metal Oxide Filled Fluoroelastomer Outer Layer With Improved Toner Release as follows:

The test plaques obtained as described above are employed to evaluate the toner offset and release force characteristics of the outermost layer of the fuser members. A plaque is cut into 1-inch (2.56-cm) squares. One of these squares is left untreated by release agent. To the surface of each of four squares is applied in unmeasured amount, one of the previously mentioned PDMS release oils: non-functionalized release oil DC-200 (PDMS); hydrogen-functionalized oil EK/PA-124.5 (PDMS-H); Xerox amino-functionalized PDMS 8R79 (PDMS-$NH_2$); and Xerox mercapto-functionalized PDMS 8R2955 (PDMS-SH).

Each sample was incubated overnight at a temperature of 175° C. Following this treatment, the surface of each sample was wiped with dichloromethane. Each sample was then soaked in dichloromethane for one hour and allowed to dry before off-line testing for toner offset and release properties.

Each sample, including those untreated with release agent, was tested in the following manner:

A 1-inch (2.56-cm) square of paper covered with unfused styrene-butyl acrylate toner was placed in contact with a sample on a bed heated to 175° C., and a pressure roller set for 80 psi was locked in place over the laminate to form a nip. After 20 minutes the roller was released from the laminate.

The extent of offset for each sample was determined by microscopic examination of the sample surface following delamination. The following numerical evaluation, corresponding to the amount of toner remaining on the surface, was employed.

1 0% offset 2 1–20% offset 3 21–50% offset 4 51–90% offset 5 91–100% offset

Qualitative assessment of the force required for delamination of the paper from the sample is as follows:

1 low release force 2 moderate release force 3 high release force

Wear Measurement

A piece of plaque 9/16"×2" was cut for the wear test. A Norman abrader (by Norman Tool, Inc.) was used, and the temperature was set at 350° F. The speed was set at ~30 cycles/minute and the load was set at 984 g.

Four rolls of paper were run on the plaque sample for 480 cycles each and the wear tracks were measured for depth by a surfanalyzer. The average of the four tracks was reported in mils.

Thermal Conductivity Measurement

A round piece of plaque 5 cm diameter was cut for the test. Thermal conductivity was measured by Holometrix™ TCA-100 Thermal Conductivity Analyzer. Reported values (BTU/hr-ft-° F.) were from two stacks of samples.

Surface Energy Analysis

Surface Energy was measured by AST products VCA-2500XE Surface energy analyzer. Polar and dispersive forces were measured using water and diiodomethane, respectively. The total force (dynes/$cm^2$) was reported.

TABLE 1

FE5840Q 100 pt with MgO/Ca(OH)2 (3:6)

| | Sample | | | |
|---|---|---|---|---|
| | C-1 | E-3 | E-1 | E-2 |
| | Fillers | | | |
| | 140 pts $Al_2O_3$ 50 pts CuO [Both Untreated] | 140 pts $Al_2O_3$ 50 pt CuO 1% SHCR [Added during compounding | 140 pts $Al_2O_3$ 50 pts CuO [both pretreated with SHCR] | 140 pt $Al_2O_3$ [pretreated with SHCR] 50 pts CuO [untreated] |
| Offset/ Release: | | | | |
| PDMS-NH2 | 1/2 | 1/2 | 1/1–2 | 1/1 |
| PDMS-H | 1/1 | 2/2 | 1/2 | 2/2 |
| PDMS-SH | 1/2 | 1/2 | 1/2 | 1/2 |
| PDMS | 1/2 | 2/3 | 1/2 | 1/2 |
| No oil | 5/3 | 3/2 | 1/2 | 3/3 |

TABLE 1-continued

FE5840Q 100 pt with MgO/Ca(OH)2 (3:6)

| | Sample | | | |
|---|---|---|---|---|
| | C-1 | E-3 | E-1 | E-2 |
| | | Fillers | | |
| | 140 pts Al$_2$O$_3$ 50 pts CuO [Both Untreated] | 140 pts Al$_2$O$_3$ 50 pt CuO 1% SHCR [Added during compounding] | 140 pts Al$_2$O$_3$ 50 pts CuO [both pretreated with SHCR] | 140 pt Al$_2$O$_3$ [pretreated with SHCR] 50 pts CuO [untreated] |
| Wear | 4.4 ± 0.4 | 2.5 ± 0.1 | 3.9 ± 0.3 | 2.7 ± 0.2 |
| Surface Energy | 31.2 | 34.1 | 33.2 | 31.2 |
| Thermal Conductivity | 0.36 | 0.42 | 0.45 | 0.48 |

SHCR — 3-mercaptopropyltrimethoxysilane

The results show that were significantly better for the sample with treated filler than for the sample with untreated filler. The selectively treated Al$_2$O$_3$ fillers (E-2, with CuO untreated) gave the best offset/release property, very low wear and highest thermal conductivity.

The invention has been described in detail with particular reference to certain preferred embodiments thereof, but it will be understood that variations and modifications can be effected within the spirit and scope of the invention.

What is claimed is:

1. A fuser member comprising a support and coated thereon an outermost fluoroelastomer layer comprising a metal oxide filler selected from aluminum oxide, cupric oxide, and mixtures thereof, said filler being treated with a mercapto-functionalized silane coupling agent, wherein the fluoroelastomer layer comprises a fluoroelastomer consisting of the following formula:

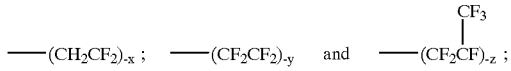

where
x is from 30 to 90 mole percent,
y is from 10 to 70 mole percent, and
z is from 0 to 30 mole percent.

2. The fuser member of claim 1, wherein x is 52 mole percent, y is 34 mole percent, and z is 14 mole percent.

3. The fuser member of claim 1, wherein x is 53 mole percent, y is 26 mole percent, and z is 21 mole percent.

4. The fuser member of claim 1 wherein the aluminum oxide is 30 to 280 parts by weight per 100 parts by weight of the fluoroelastomer.

5. The fuser member of claim 1 wherein the cupric oxide is 10 to 50 parts by weight per 100 parts by weight of the fluoroelastomer.

6. The fuser member of claim 1 wherein the silane coupling agent has the general structure:

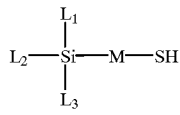

wherein:
L$_1$, L$_2$, and L$_3$ represent alkoxy, alkyl, or halide, with C atom numbers varying from 0–10 and at least one of the L is an alkoxy or halide and M represents an aliphatic or aromatic chain with C atom numbers varying from 0–20.

7. The fuser member of claim 6 wherein the silane coupling agent comprises a functional group selected from alkoxy and halide.

8. The fuser member of claim 1 wherein the silane coupling agent is selected from mercaptomethyldimethylethoxysilane, (mercaptomethyl) methyldiethoxysilane, 3-mercaptopropylmethyldimethoxysilane, 3-mercaptopropyltrimethoxysilane and 3-mercaptopropyltriethoxysilane.

9. A fuser member comprising:
a support;
a base cushion layer; and
an outermost fluoroelastomer layer comprising a metal oxide filler selected from aluminum oxide, cupric oxide, and mixtures thereof, said filler being treated with a mercapto-functionalized silane coupling agent, wherein the fluoroelastomer layer comprises a fluoroelastomer consisting of the following formula:

where
x is from 30 to 90 mole percent,
y is from 10 to 70 mole percent, and
z is from 0 to 30 mole percent.

10. The fuser member of claim 9 wherein the base cushion layer comprises silicone rubber.

11. The fuser member of claim 9 wherein the base cushion layer contains a thermally conductive filler.

12. The fuser member of claim 9 further comprising an adhesion layer between the base cushion layer and the fluoroelastomer layer.

13. The fuser member of claim 1 or 9, further having a polydimethylsiloxane release agent applied to the fluoroelastomer layer in an amount sufficient to produce, upon incubation at elevated temperature, a surface having improved toner release properties on said outermost layer.

14. The fuser member of claim 13 wherein the polydimethylsiloxane release agent has the formula

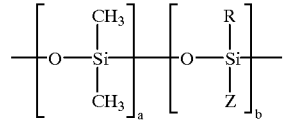

where R is alkyl or aryl, Z is selected from the group consisting of hydrogen, aminoalkyl containing up to about 8 carbon atoms, and mercaptoalkyl containing up to about 8 carbon atoms, and the ration of a:b is about 1:1 to 3,000:1.

15. The fuser member of claim 14 wherein Z is aminopropyl or hydrogen.

16. The fuser member of claim 14 wherein Z is hydrogen, aminopropyl, or mercaptopropyl.

17. The fuser member of claim 16 wherein Z is aminopropyl and the a:b ratio is 200:1 to 2,000:1.

18. The fuser member of claim 14 wherein Z is hydrogen and the a:b ratio is from 10:1 to 200:1.

* * * * *